United States Patent [19]

Ganske et al.

[11] 4,139,901
[45] Feb. 13, 1979

[54] DOCUMENT STORAGE AND RETRIEVAL SYSTEM

[75] Inventors: Kingston E. Ganske, Auburn; Mervin L. Falk, Sunnyvale, both of Calif.

[73] Assignee: Teknekron, Inc., Berkeley, Calif.

[21] Appl. No.: 793,531

[22] Filed: May 4, 1977

[51] Int. Cl.$^2$ ............................................... G06F 3/14
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,648,249 | 3/1972 | Goldsberry | 364/900 |
| 3,689,894 | 9/1972 | Laura et al. | 364/900 |
| 3,753,240 | 8/1973 | Merwin | 364/200 |
| 3,949,375 | 4/1976 | Ciario | 364/200 |

Primary Examiner—Harvey E. Springborn
Attorney, Agent, or Firm—Flehr, Hohbach, Test, Albritton & Herbert

[57] ABSTRACT

A document storage and retrieval system featuring a plurality of remotely disposed control terminals arranged in data transfer relation to a computer includes a plurality of document storage units containing documents recorded on film. These units include means for converting an optical image of such documents to video signals. A plurality of video buffer units associated with each of the terminals are coupled by switching means to any one of the document storage units so that the video signals derived therefrom and representing the documents can be stored on a video buffer unit associated with a given terminal.

7 Claims, 4 Drawing Figures

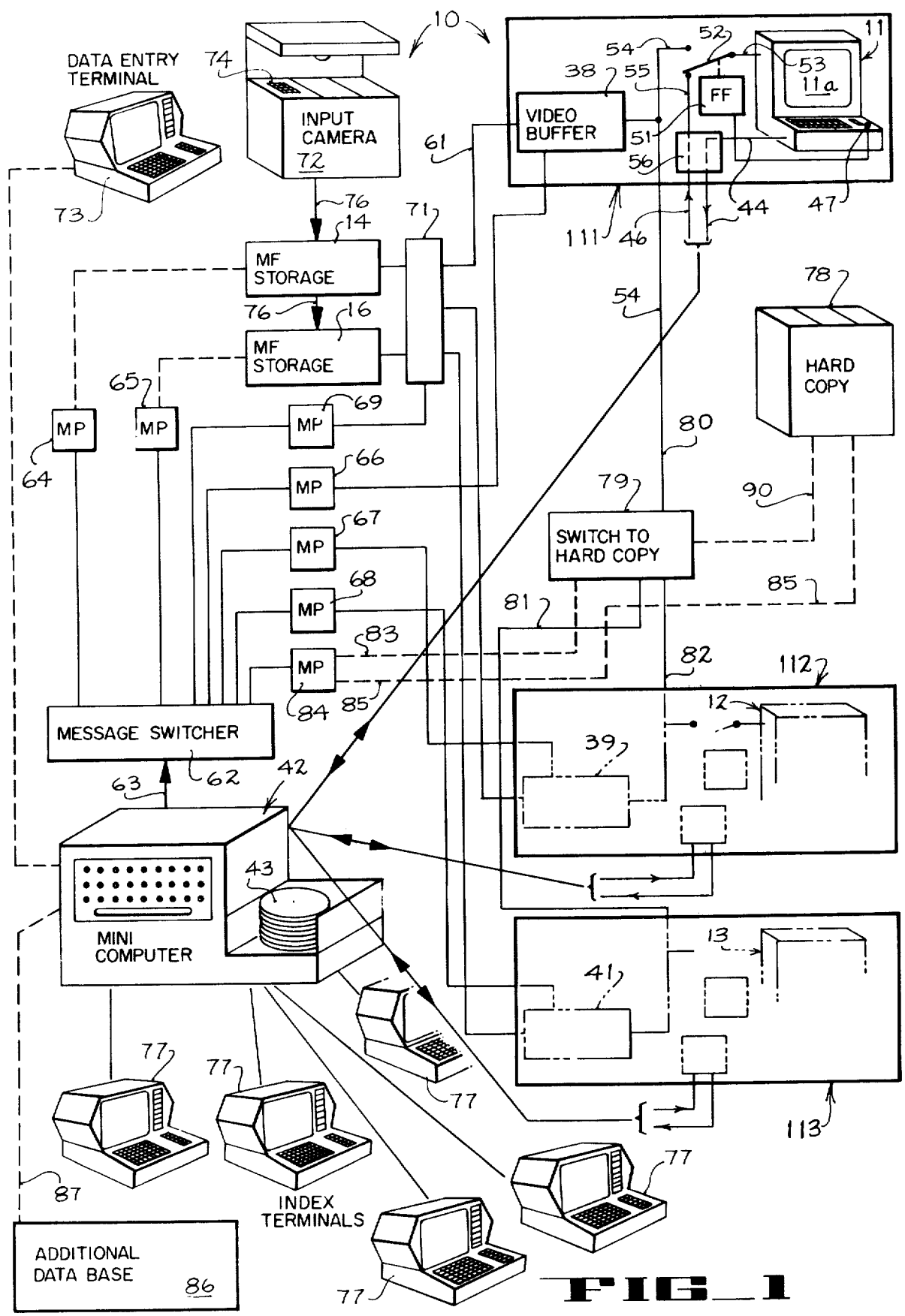
FIG_1

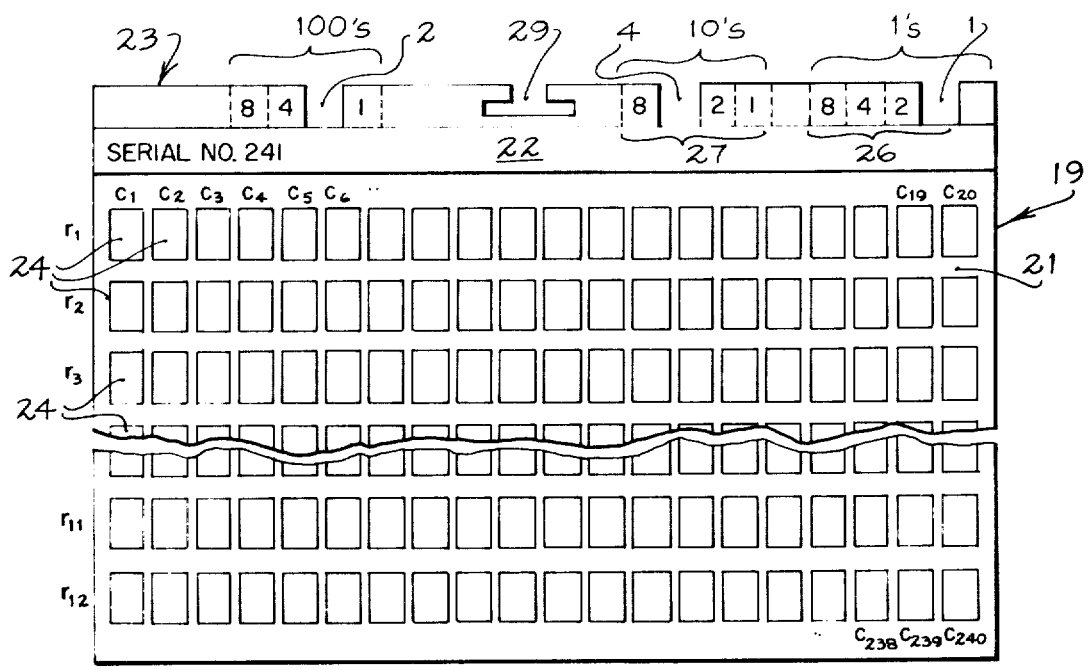
FIG_2
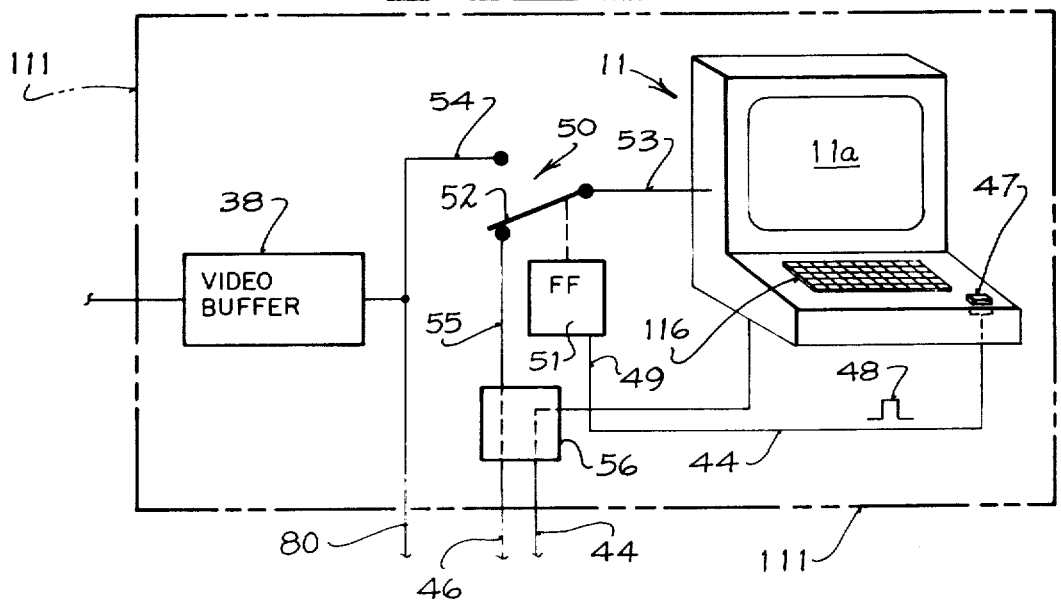
FIG_3

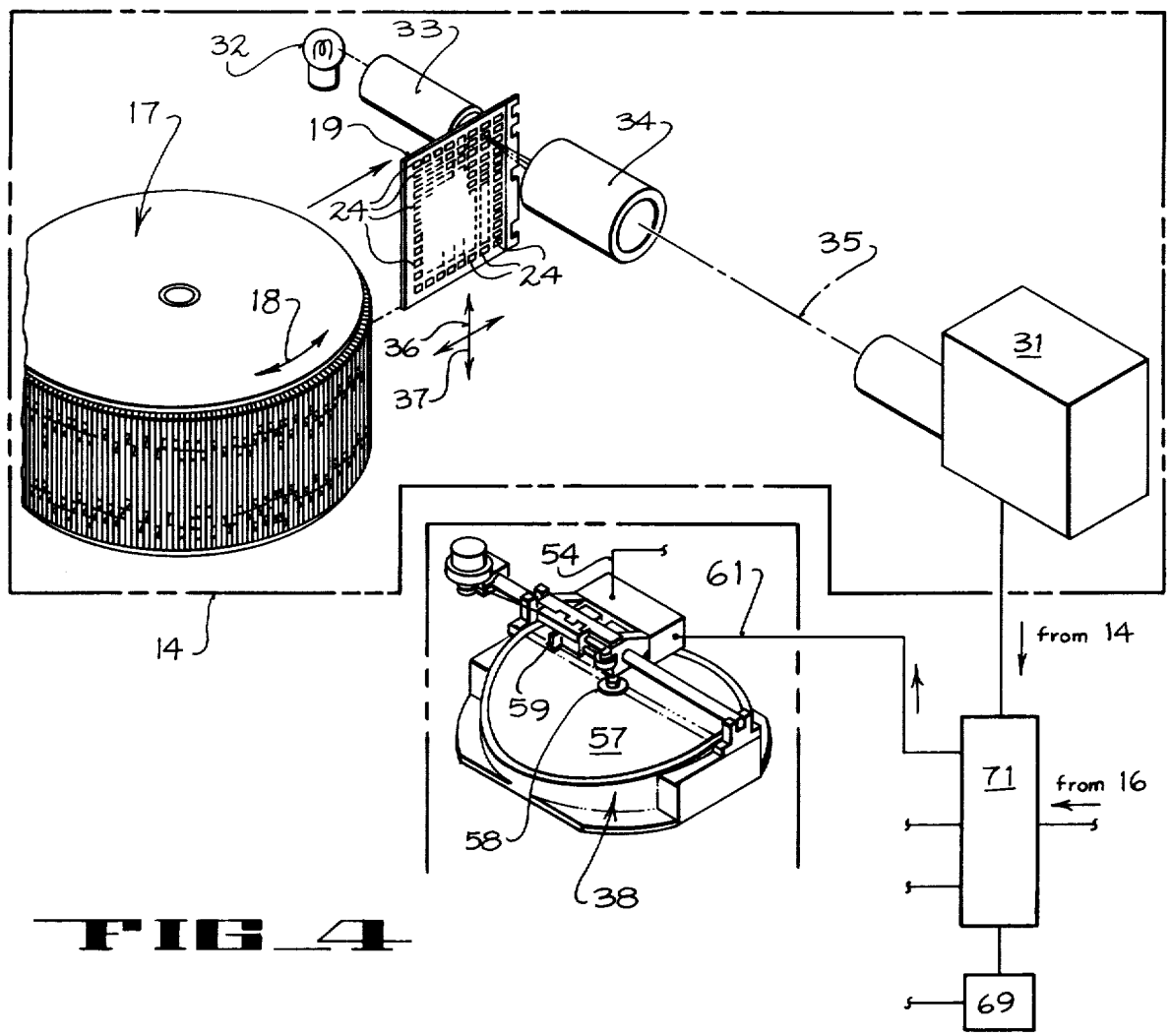
FIG_4

DOCUMENT STORAGE AND RETRIEVAL SYSTEM

BACKGROUND OF THE INVENTION

This invention pertains to document storage and retrieval systems and more particularly to a document storage and retrieval system in which a number of remotely located control terminals having video display portions can each obtain information from a central location selectively in alphanumeric or video format.

In applications such as where insurance claims offices are located widely about the country for a single insurance company or agency, each office has a need for being able to obtain a listing of documentation maintained in a given file or associated with a particular customer and to readily examine a copy of any one of the particular documents so listed. In this way each insurance claims officer can be fully informed of the background situation involved with any given claim being handled through his or any other office of the company.

Accordingly, there is a need for an improved document storage and retrieval system characterized by remotely located control units.

In systems of the above kind the capability of a single terminal to tie up the central document storage means and cause other terminals to have to wait for long periods to obtain access to the central document storage means constitutes an important problem in the use of such systems. Accordingly, there has been a need for a system which avoids the foregoing and other problems.

SUMMARY OF THE INVENTION AND OBJECTS

In general a document storage and retrieval system of a type having prerecorded documents and means for retrieving selected ones of the documents includes a plurality of video buffer storage units each adapted to retain thereon recorded signals representative of selected prerecorded documents. Computer means including a data storage and retrieval portion containing information relative to the documents is operated in response to requests from control terminals having video display portions for viewing any document retrieved from storage. Means for selectively connecting the terminals to the video storage units or to the computer means serves to obtain either a video display of a document or an alphanumeric presentation of information relative to the documents in the storage.

In general it is an object of the present invention to provide an improved document storage and retrieval system making wide usage of remotely located video and monitors.

It is another object of the present invention to provide an improved system of the kind described which permits a number of control terminals to be operating contemporaneously with each other without introducing great time lag in receiving information at the control terminal from the filmed storage.

The foregoing and other objects of the invention will become more readily evident from the following detailed description of a preferred embodiment when considered in conjunction with the drawings.

BRIEF DESCRIPTION OF THE DRAWINGS

FIG. 1 shows a diagrammatic block diagram view of a system according to the invention;

FIG. 2 shows a plan view of a microfiche record assembly;

FIG. 3 shows a diagrammatic view of a control terminal assembly according to the invention; and FIG. 4 shows a perspective view of a microfiche carousel document storage file with means for converting an optical image thereon into video signals representative of the document so that the video signals can be recorded on a buffer storage unit as associated with control terminals.

DETAILED DESCRIPTION OF A PREFERRED EMBODIMENT

The system 10 shown in FIG. 1 represents an organization of components arranged to provide substantial advantages in a document storage and retrieval system. In one application for the system, a number of document retrieval control terminals 11, 12, 13 are generally arranged so that the operator of each terminal can request a listing (or other format) identifying by name or otherwise various documents in a given file associated with a particular account. Computer means 42 supplies this information to the requesting terminal for display. Having examined the listing of documents the operator of the terminal can then select any given document or documents for purposes of viewing the full document on the video display 11a of terminal 11. Similar displays 12a and 13a are associated with terminals 12 and 13.

Addressable storage units 14, 16 in the form of known carousel microfiche storage systems are provided in which a rotatable carousel storage assembly 17 is mounted for rotation in each of two opposite directions represented by arrow 18. Assembly 17 carries a large number of microfiche card-like assemblies 19 as shown best in FIG. 2. Each assembly 19 comprises a sheet or panel 21 of photographic film on which images 24 of a great number of documents have been recorded. In the present instance the recording surface is 4" × 6" and the number of documents which can be recorded is 240. Twelve (12) documents can be recorded in each column "c" while the images of twenty (20) documents can be recorded along each row "r". The upper edge margin of panel 21 receives an elongate resilient clip 23 with opposed jaws sprung together for engaging the edge margin of panel 21. Clip 23 includes an indicia area 22 for logging a suitable serial number for identifying each particular microfiche assembly 19. For example, the serial number shown is "241" in assembly 19 in FIG. 2. Clip 23 includes codable edge portions 26–28 having a number of binary positions which can be notched to be sensed by sensing blades or fingers associated with the apparatus, as is known. The combination of the binary numbers of the codable edge portions provides a binary coded decimal number.

Accordingly, in the coding portion 26 four possible notches can be removed from the edge of element 23 at any one of four positions representing the binary numbers 1, 2, 4, 8 respectively when notched. In one known system a binary coded decimal notching of the edge of clip 23 has been provided as shown in which notches in the coding portion 26 represents units whereas notching in portion 27 represents tens. Any notches in coding portion 28 represents hundreds. Thus, in the present instance where the microfiche assembly 19 bears Ser. No. #241 it is to be noted that a notch has been formed in the "2" position of the 100's coding portion 28, a notch has been formed in the "4" position of the 10's coding portion 27 and a notch has been formed in the "1" position of the units portion 26. Finally, for purposes of withdrawing a given microfiche assembly 19 from its carousel, means such as the inverted T-shaped opening 29 have been provided for cooperations with a known mechanical element (not shown) which is of similar configuration and cooperates therewith in withdrawing the same from the carousel unit 17.

Means for converting images 24 into video signals representative thereof is diagrammatically represented in FIG. 4 in which the target contained in a video camera 31 is disposed to receive an optical image of the document by passing light from a light source 32 through an optical system including lenses 33, 34. Means represented diagrammatically by the mutually perpendicularly oriented arrows 36, 37 positions the microfiche assembly 19 so as to dispose a selected one of images 24 in the light path defined by lenses 33, 34. Apparatus of the kind described is known in the art and accordingly, it is not believed necessary to further describe this type of apparatus.

In this manner there is provided means for converting the document images into video signals representative thereof.

A plurality of video buffer storage units 38, 39, 41 of a type as shown in FIG. 4 record video signals representative of the selected document images. In this way microfiche assembly 19 is required to be withdrawn from carousel 17 only long enough to record its content into buffer 38. Thus, assembly 19 can be quickly restored to carousel assembly 17 for use by others.

Accordingly, buffer storage units 14, 16 as represented by their boxes in FIG. 1 incorporate apparatus of the kind described in FIG. 4 enclosed within the phantom line also referred to as number 14.

System 10 includes computer means 42 including data storage means 43 such as a rotating stacked disc file for containing information associated with each prerecorded document image 24.

In one suitable application of system 10, data storage means 43 includes indexing information for the serial numbers and sequence numbers associated with each of the prerecorded document images on all of the microfiche assemblies 19 in carousels 17. The "sequence number" serves to identify a given one of 240 images 24 on a given microfiche assembly 19.

Terminals 11-13 are each respectively a part of a terminal assembly 111, 112, 113 as shown in FIG. 3 with respect to terminal assembly 111 bounded by the phantom line so designated. At this point terminal 11 and terminal assembly 111 will be described and it is to be understood that terminals 12, 13 and associated terminal assemblies 112, 113 are similarly constructed.

Accordingly, terminal 11 is coupled to computer means 42 via digital entry lines 44 leading to computer means 42 and digital readout lines 46 from computer means 42. Terminal 11 includes a keyboard data entry means 11b of known construction for transmitting requests for information to computer means 42. Accordingly, by operation of keyboard 11b a request can be generated from terminal 11 via line 44 to computer means 42. Computer 42 can, in conventional style accumulate appropriate responses to the request from data storage means 43 and provide alphanumeric data transmission via the digital readout line 46. This information will appear on the display 11a of terminal 11 under conditions as now to be described.

Keyboard 11b includes a selector key 47 serving to supply a signal represented by the single pulse 48 via lead 49 to a stepping circuit 51 of a type such as controlled by a bi-stable flip-flop whereby each successive signal 48 supplied to circuit 51 serves to reverse the condition previously existing. In the present instance the flip-flop portion of circuit 51 is suitably arranged with means for operating a switch armature 52 between advanced and retracted positions in response to signals 48. Closure of armature 52 alternately interconnects the display input line 53 selectively with either the output line 54 from video buffer storage unit 38 or the lead 55 which serves to supply a digital readout of signals from computer means 42. The readout of signals from computer means 42 is transmitted via lead 46 to means 56 for refreshing the signal on display 11a periodically at intervals of 1/60th of a second as is known.

Accordingly, a person operating terminal 11 can request from computer means 42 either alphanumeric information via line 46 or video information via line 54.

In order to retrieve a document and to project it onto the viewing display 11a of terminal 11 and after the operator associated with terminal 11 has made a request for a particular document via lead 44, means responsive to instructions from computer means 42 provide additional instructions to a selected one of the addressable storage units 14, 16 so that one of those two storage units provides the selected prerecorded document image for conversion into video signals.

It is to be appreciated that a carousel storage assembly such as shown at reference 17 requires as is known a number of specific instructions in order to retrieve a particular microfiche assembly 19. These additional functions can include an instruction for rotating the file 17 of microfiche assemblies in one direction or the other in order to provide minimum access time; an instruction to sense when a particular microfiche assembly has arrived at a withdrawal station; instructions for withdrawing the given microfiche and for positioning the requested document image into the light path 35 of the system; and all instructions to accomplish replacement of the microfiche assembly at its correct location in the file.

Similarly, specific instructions are required to be directed to each video buffer unit 38 which, as shown, comprises generally a pliant magnetic disc 57 mounted for rotation about the axis of a hub 58. A magnetic transducer assembly 59 is supported to move along and cooperate with a radial portion of the rotating disc 57 so as to record data in a number of concentric tracks radially spaced one from the next.

Video buffer 38 receives video signals representative of the recorded document images 24 via a connecting cable 61 coupled to camera 31. Similarly the output from the video buffer unit 38 is transmitted via a connecting cable 54 to switch 50.

Accordingly, some of the specific instructions which are required to be delivered to buffer storage unit 38 (and 39, 41) in order to operate same include instructions for recording, timing functions, erasing signals, head stepping to appropriate track positions, selecting the transducer to be operated, and the like.

Means in FIG. 1 responsive to instructions from computer means 42 for providing instructions of the kind described to a selected one of the addressable storage units 14, 16 includes a message switcher unit 62 of known construction which serves to receive indexing information along the path, such as indicated by the arrow 63, to provide operating information to selected micro processors 64–69, 84.

Thus, each addressable storage unit 14, 16 is associated with its own microprocessor unit 64, 65. The outputs from these microprocessors are shown in dashed lines representing the transmission of suitable instructions to units 14, 16 as dictated by message switcher 62. Similarly, microprocessors 66, 67 and 68 when activated by suitable instructions from message switcher 62 serve to provide specific functional controls to the video buffer systems 38, 39 and 41 respectively.

It is to be appreciated that upon requesting a given document to be displayed the requestor does not know in which of the two storage units 14, 16 the requested document will be found. Means 71 for switching the video output from storage units 14, 16 to any one of the three video buffer units 38, 39, 41 in response to control from computer means 42 includes a microprocessor unit 69 operated by message switcher 62. One suitable switching means 71 is a cross-point switching device of known construction for switching either or both of the two inputs to any one or more of the three outputs.

Thus, switching means 71 has been interposed between storage units 14, 16 and video buffer storage units 38, 39, 41 for directing video signals of a selected document image to a video buffer unit associated with the terminal requesting the display of that particular document image.

Means responsive to instructions from computer means 42 serves to operate switching means 71 to transfer the video signals of the selected document image to the video buffer unit associated with the terminal requesting the display of the requested document.

According to one application, the procedure for indexing and recording document images on microfiche assemblies for adding to the stored information in units 14, 16 proceeds as now to be described. An operator of an input camera 72 receives a bundle of documents to be entered into the carousel storage units. As noted above, each microfiche assembly 19 must have a serial number so that it can be retrieved. The computer 42 supplies serial numbers upon request in known manner to a data entry terminal 73. The operator of data entry terminal 73 then gives the serial number to the operator of input camera 72. The input camera operator then enters the serial number by means of a ten key coding device 74 of known construction which serves to apply the serial number to the microfiche assembly as part of the recording procedure for assembly 19. Subsequently, each of the documents are photographed by input camera 72 and an archival roll of film is kept. The microfiche recordings are, however, assembled and transmitted into the microfilm storage units 14, 16 as represented by the flow path lines 76.

In addition to having a document display portion 11a, the document retrieval control terminals 11-13 include index means in the keyboard for initiating requests to the system. Accordingly, terminals 11, 12, 13 are all referred to as document/index terminals as distinguished from the index terminals 77 which are operatively coupled to computer means 42 for purposes of obtaining an alphanumeric readout of information on various accounts maintained by the company. The function of these index terminals is believed adequately explained above with respect to the index terminal portion of terminals 11-13.

In the event that an operator at one of terminals 11-13 desires a copy to be printed of the document being displayed on his associated terminal, the operator merely presses an appropriate key or combination of keys located at his associated keyboard 11b to transmit an appropriate signal via lead 44 to computer means 42 with such request. Computer means 42 then instructs message switcher 62 as to which of the several terminals has made the request and an associated microprocessor 84 is then signaled to provide a suitable control signal to a cross-point switcher 79 which serves as a video source selector since switcher 79 is continuously receiving video via all lines 80, 81, 82 with respect to all terminals, 11-13. Accordingly, if the instruction to microprocessor 84 has been that the second terminal 12 is the one requesting the document, then microprocessor 84 provides an appropriate control signal via line 83 which is coupled into switcher 79. At an appropriate time microprocessor 84 provides a "print" signal via a second control line 85 so as to cause printer 78 to commence printing that which is coupled via switcher 79 into printer 78 on lead 90.

Thus, switch 79 operated in response to signals from computer means 42 via lead 83 serves to select the video source for copying.

Finally, an additional data base 86 can readily be available to add additional information to the storage capacity of computer means 42 as desired. Thus, the dashed line 87 represents an interconnection for information transfer from the additional data base 86 with respect to the storage means 83 of computer means 42.

From the foregoing it should be readily evident that there has been provided an improved document storage and retrieval system wherein an operator at any of the terminals 11-13 is in a position to be able to request a listing of documents in a given file and have them displayed so that those pertinent to a given problem can be selected for viewing. Accordingly, the operator of the terminal has the option of obtaining one or the other and with a relatively low access time due to the fact that video buffers have been interposed between the microfilm storage files and the output terminals so that the microfilm storage files remain isolated from any prolonged activity at the terminal end of the system. Further, a system of the kind described has the flexibility of being able to accumulate a number of documents and to organize them in a particular manner in any given video buffer.

We claim:

1. A document storage and retrieval system comprising a plurality of addressable storage assemblies including storage elements containing prerecorded information representative of images of documents and a plurality of means for retrieving said storage elements, each of said retrieving means being respectively associated with a related one of said storage assemblies, means for converting the document images into video signals representative thereof, a plurality of control terminals each including a buffer storage unit for recording said video signals representative of said images, said control terminals having video displays associated therewith coupled to receive video output signals from its video buffer storage unit for displaying images thereon, computer means including data storage means containing identifying information associated with each prerecorded document image, and means selectively operable from said terminals for coupling said terminals selectively in information transfer relation with respect to said computer means for either receiving document information from said computer or video information via the buffer storage unit of the terminal requesting the document information.

2. A document storage and retrieval system according to claim 1 in which said addressable storage assemblies includes a plurality of document storage units each containing prerecorded images of documents and each including an associated means for converting the document images to video signals representative of said document images, and means operably responsive to said computer means for switching said video signals from each of said document storage assemblies to each of said plurality of terminals.

3. A document storage and retrieval system comprising a plurality of addressable storage assemblies including storage elements containing prerecorded information representative of images of documents and a plurality of means for retrieving said storage elements, each of said retrieving means being respectively associated with a related one of said storage assemblies, means for converting the document images into video signals representative thereof, a plurality of control terminals each including a buffer storage unit for recording said video signals representative of said images, said control terminals having video displays associated therewith coupled to receive video output signals from its video buffer storage unit for displaying images thereon, computer means including data storage means containing identifying information associated with the location of each prerecorded document image, said terminals being coupled to said computer means for requesting the display of a given document, means responsive to instructions from said computer means for providing instructions to a selected one of said addressable storage assemblies for obtaining therefrom a selected prerecorded document image to be converted into video signals representative thereof, and switching means responsive to said computer means interposed between said selected storage assembly and said video buffer storage units for directing video signals of a selected document image to a video buffer unit associated with the terminal requesting the display of said given document.

4. A document storage and retrieval system comprising a plurality of addressable storage assemblies including storage elements containing prerecorded information representative of images of documents and a plurality of means for retrieving said storage elements, each of said retrieving means being respectively associated with a related one of said storage assemblies, means for converting the document images into video signals representative thereof, a plurality of control terminals each including a buffer storage unit for recording said video signals representative of said images, said control terminals having video displays associated therewith coupled to receive video output signals from its video buffer storage unit for displaying images thereon, computer means including data storage means containing information associated with each prerecorded document image, means for selectively coupling said terminals to said computer means for requesting the display of a given document, means responsive to said computer means for providing instructions to a selected one of said addressable storage assemblies for obtaining therefrom a selected prerecorded document image to be converted into video signals representative thereof, switching means interposed between said storage assemblies and said video buffer storage units for directing video signals of a selected document image to a video buffer unit associated with the terminal requesting the display of said given document, and means responsive to said computer means for operating said switching means to so transfer said video signals.

5. In a document storage and retrieval system of a type having prerecorded images of documents and means for retrieving selected ones of said document images, a plurality of video buffer storage units each adapted to retain information representative of recorded images of said documents, control terminals each including a said video buffer storage unit adapted to retain information representative of recorded images of said documents, said terminals each including a video display portion, computer means including a data storage and retrieval portion containing information relative to said documents, means for selectively connecting said terminals to said video storage units or said computer means to obtain either a video display or a document or an alphanumeric presentation of said information relative to said documents.

6. A document storage and retrieval system according to claim 5 in which the last named means comprises means selectively operable from said terminals, said terminals being disposed at remote positions from said computer means.

7. In a document storage and retrieval system having computer means for addressing document storage means to provide an image of a selected document, and having means for converting the image to video signals representative thereof, a control terminal assembly comprising a control terminal coupled in data transfer relation to the computer means, said terminal including a video display portion, a video buffer storage unit for selectively recording the video signals, and means selectively operable to feed the video signals to said display portion or to couple the computer means to said display portion for presentation thereon of alphanumeric information from the computer means.

* * * * *